UNITED STATES PATENT OFFICE.

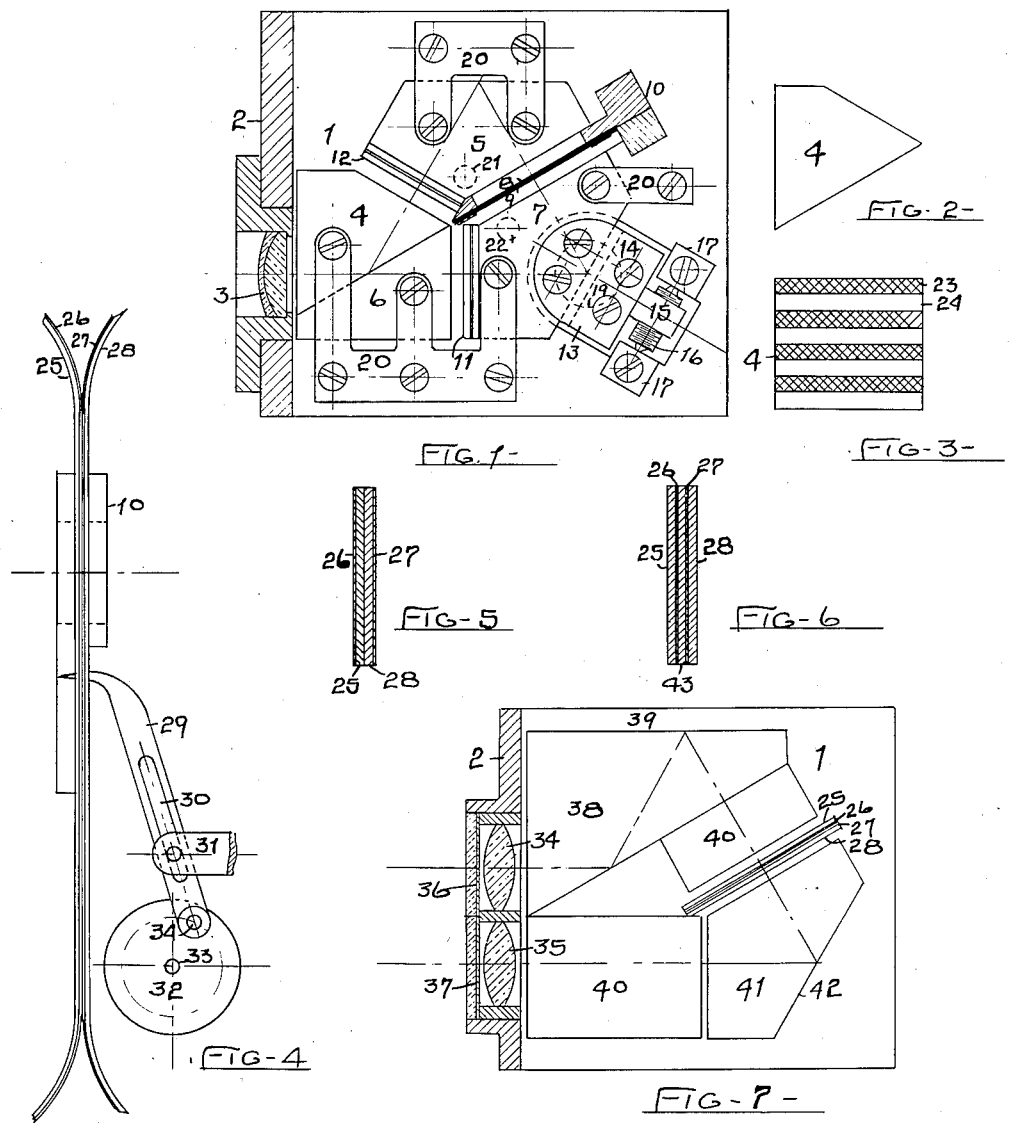

PERCY D. BREWSTER, OF EAST ORANGE, NEW JERSEY.

COLOR CINEMATOGRAPHY.

1,253,136.      Specification of Letters Patent.      Patented Jan. 8, 1918.

Application filed November 7, 1914. Serial No. 870,753.

*To all whom it may concern:*

Be it known that I, PERCY D. BREWSTER, a citizen of the United States, residing at East Orange, in the county of Essex and State of New Jersey, have invented certain new and useful Improvements in Color Cinematography, of which the following is a full, clear, and exact description.

This invention relates to color photography particularly color cinematography, of the class in which two optical images of the same object are projected on to two superposed sensitized surfaces in light of two different colors or groups of colors, so that upon development and further treatment two substantially complementary negative images are produced suitable for the printing of positives. Such a system is described in my copending applications Ser. Nos. 815,153, filed January 29th, 1914, 841,797, filed May 29th, 1914 and 870,752, filed Nov. 7, 1914, to which reference may be made for a more complete explanation of the same; but it is to be understood that the procedure specifically described in the applications is not the only one in which the invention can be advantageously employed.

The present invention has to do with the production of the negatives especially for cinematographic work, and its chief object is to provide a simple and effective method by which cinematographic film, coated on one side only and suitably sensitized can be utilized for the purpose. To this and other ends the invention consists in the novel method and the novel steps thereof, hereinafter described.

In the accompanying drawing I have illustrated, somewhat diagrammatically, convenient and effective apparatus suitable for use in practising the invention, and referring now thereto, Figure 1 is a sectional plan view of a camera for projecting the images on to the two superposed films. Figs. 2 and 3 are plan and side views, respectively, of the light-splitting prism employed in the camera. Fig. 4 is a detail side view of suitable intermittent film-feeding mechanism. Figs. 5 and 6 are sectional views showing two methods of arranging the films for passage through the film-gate of the camera.

Fig. 7 is a view of a camera employing two lenses.

The lens diaphragms, shutters and light proof camera housing are omitted from the drawings for the sake of simplicity, as they are well understood in the art.

The particular camera illustrated consists of the base 1 with a front wall 2, in which is mounted the lens 3. Rays of light from the object (not shown) are projected by the lens 3 into the prism 4 against its surface $4^a$, provided with silvered bands 23, Fig. 3, in alternation with unsilvered or clear bands 24. The prism is banded with alternate layers of silver, cemented on the clear spaces by Canada balsam to the prism 6, so that part of the light projected by the lens is reflected by the silvered bands 23 into the prism 5 against the silvered surface 20 and thence onto the sensitized surface 8 in the film-gate 10, while the other portions of the light are transmitted through the clear spaces 24 and prism 6 into prism 7, whence it is reflected by the silvered surface of the prism 7 against the other sensitized surface, 9, in the film-gate. The images on the two sensitized surfaces by preference substantially congruent, but one image may be slightly larger than the other though in exact registry in the center of the picture. To produce congruence it is evident that the number of reflections in the case of one image (either one) must be even and the other odd, such as one and two or two and three.

If the films 8, 9 are sensitized panchromatically it is necessary to interpose light filters 11, 12, in the paths of the rays beyond or back of the prism 4, so that the image projected on one sensitized surface will be in light of one group of colors, say yellow-green to violet in the spectrum and on the other sensitized surface in light of another group of colors, say, red to yellow-green, the two filters being in each case adapted to prevent the passage of light of the undesired color or colors. If one of the surfaces be sensitized chiefly for one color group in the spectrum, say, from yellow-green to violet and the other surface chiefly for another color-group, say from red to yellow, the light filters may be dispensed with entirely; or filters of lighter shades may be used to reduce or completely prevent the action of the blue and violet light on either or both of the sensitized surfaces.

The two films may be passed through the film gate with their sensitized surfaces in contact with each other and with the supports 25 and 28, made of a transparent material such as celluloid, on the outside as in Fig. 4; or the films may be reversed, with their sensitized surfaces on the outside as shown in Fig. 5; or the sensitized surfaces may be on either the outside or inside with a strip 26 of opaque material such as paper between the two films as illustrated in Fig. 6, to prevent light passing through one film from acting on the other and also to prevent the emulsions, under adverse weather conditions, from sticking together.

A standard film feeding mechanism is illustrated diagrammatically in Fig. 4, in which the claws 29 are adapted to pass through the usual perforations or sprocket holes in the two films and feed them both simultaneously. If the paper separator, shown in Fig. 6, be used, it is to be understood that any type of feeding mechanism, such as the Geneva or the dog movement, may be used to feed the separator and the two films together. The claws 29, containing the slot 30 which is adapted to swing and slide on the stationary pin 31, is mounted to oscillate on the crank pin 34 attached to the crank disk 32 which revolves on its center 33 in harmony with the shutter and the take-up and film-feeding mechanisms adapted to control the passage of the film through the camera, in the usual way.

A camera employing two lenses is shown in Fig. 7, in which the two lenses 34 and 35, (adapted to form images of equal or almost equal size on the film) are protected by filters 36 and 37 respectively, the image projected by one lens being totally reflected twice by prism 38, one on its first reflecting surface at an angle of approximately 30 degrees to the optical axis and the second time on the silvered surfaces 39 and thence onto the sensitized surface 26 of one of the films, while the light projected from lens 35 passes through block 40 and prism 41 and is reflected by the surface 42 against the sensitized surface 27 of the other film.

After the negative films are developed and fixed they are placed on opposite sides of a double coated positive film and the images printed from the negative film onto the two sides of the positive film as described in my application Ser. No. 841,797, above mentioned. In cinematographic work it is absolutely essential that these positive images be in proper registry, as the tiny pictures are in projection upon the screen enlarged to upward of a hundred and forty-four diameters, or seventeen hundred times. If two entirely separate films be used (as in the drawing) it is preferable that they should be of exactly the same width and fit very closely to the sides of the film gate and that they should be perforated simultaneously when their edges are absolutely even and be fed through the film gate with the same claws.

The great advantage of feeding films, perforated simultaneously, through the same film gate, where they are exposed to absolutely registering images, by means of the same claws, over the use of separate film gates without means of determining whether the images are exactly equal distances from the sides of the film and from the perforations thereof, and the necessity of feeding the film by means of two claws, is readily apparent, particularly in view of the fact that a five hundredth of an inch error in registration results in an error of from a quarter to three-eighths of an inch on the screen, thereby forming two separate images in different colors.

In the moving-picture projectors commonly used the light from the arc or other source is received by the condensing lens or lenses and is projected in the form of a cone of rays the apex of which is usually at the projecting lens. This cone of rays passes through the film, which of course is between the projecting lens and the condensers. It is therefore clear that although the axial ray is perpendicular to the film, the other rays are not. This means that if a given ray (other than the axial) strikes the rear surface of the film at a distance X from the margin of the film it will not emerge from the front surface at the same distance from the margin but at a distance $X+D$, in which expression the quantity D is quite small but nevertheless appreciable, depending, in general, upon the thickness of the film as well as upon the degree of taper of the cone of rays. Suppose, now, that the image on the rear surface and the image on the front surface are exactly superposed, one on the other, so that a ray perpendicular to one surface at a given point in the image thereon will pass perpendicularly through the corresponding point of the image on the other surface. Then it will be clear that if the ray is not perpendicular to the rear surface it will not pass through the corresponding point of the image on the front surface but will pass through some other point, nearer the center of the film. In other words, the two images will not be in perfect registry on the screen although they were perfectly superposed on the film. Moreover, since the rays at the margins of the cone are more inclined from the optical axis than are the rays near the axis, the difference at the margins of the film will be greater than at points near the center. I therefore prefer to have the images in exact superposition only at the center, and have the rear image (the one next to the base of the cone of rays) sufficiently larger to compensate for the angularity of the non-axial rays. Then a ray which is inclined to the film will find in its path through the front surface a point of the front image corresponding exactly with the point through which it passed in the rear surface, and accordingly the two images will register exactly on the screen. If the positives are made by contact printing, the images on one negative should be larger than those on the other, so that the images on one side of the positive film may be correspondingly larger than those on the other side. Such negatives can be made with the two lens camera, shown in Fig. 7, by having one lens of longer focal length than the other so as to produce a larger image on the film. With the one-lens camera, Fig. 1, the lens may be corrected to bring the red-orange-yellow rays to a focus slightly farther from the lens than the other rays, so that the image formed on the "red" side will be correspondingly larger than that formed on the "green" side. Or the rays of one group can be made to pass through more glass than the others pass through, as for instance one of the reflecting prisms may be larger than the corresponding prism on the other side. Then of course, the rays passing through the greater thickness of glass will come to a focus farther from the lens and will therefore give a correspondingly larger image.

It is to be understood that this camera may be used for exposing the film described in my co-pending patent applications Ser. No. 814,797, before mentioned, and Ser. No. 846,966, filed June 24, 1914, in which the two films are attached, temporarily or permanently, along one edge, the only modification necessary in the camera being to widen the film gate to permit of the passage of the wider film. This type of film is preferably perforated simultaneously through both films and the spacer (if used), and is fed through the film gate by the claws passing through the registering perforations in both films and acting simultaneously on them.

In the appended claims I have used the expression "registry" or "suitable registry" and the like, to mean such registry or superposition of the negative images as will permit the printing of positive images capable of projection upon a screen without material or appreciable separation of the images thereon.

I claim:—

1. In the art of color cinematography, the steps comprising supporting in the same film gate two superposed sensitized films, receiving light from a colored object and projecting the same, part with an odd number of reflections to one side of the superposed films and part with an even number of reflections to the other side, to produce two separate images in suitable registry, an image on each film, and developing both films to produce negative color-records of the object photographed.

2. In the art of two color cinematography, the method for producing negatives as herein described, comprising projecting from the same point of view in different colors from opposite sides onto the sensitized surfaces of two films mounted face to face in the same film gate, two separate images in suitable registry, with an odd number of reflections of the light on one side of the films and an even number of reflections on the other, and developing and fixing the films to obtain separate negative color-records of the object photographed.

3. In the art of color cinematography, the method herein described for producing negatives, comprising projecting from the same point of view separate registering images in different colors or groups of colors from opposite sides upon color-sensitized surfaces of two films mounted in the same film gate and having feed-perforations in exact register by means of which the said films are fed through the film gate, with an odd number of reflections of the light on one side of the films and an even number of reflections on the other, and developing and fixing the said films to obtain substantially complementary negative-records of the objects photographed.

4. In the art of color cinematography, the method herein described for producing negatives, comprising projecting two separate images from opposite sides and in different colors, upon color-sensitized surfaces of two films mounted in the same film-gate, with an odd number of reflections of the light on one side of the films and an even number of reflections on the other, the films having series of perforations in exact register with each other, employing such perforations for feeding the two films simultaneously through the said film gate, and developing and fixing the two films.

5. In the art of color cinematography, the method herein described for producing negatives, comprising projecting an image upon a film sensitized for one group of colors of the spectrum and mounted in a film gate, and projecting from the opposite side a suitably registering image of the same object on another film sensitized for another group of colors, superposed on the first film and mounted in the same film gate, with an odd number of reflections of the light on one side of the films and an even number of reflections on the other, and developing and fixing the two films.

In testimony whereof I affix my signature in the presence of two subscribing witnesses.

PERCY D. BREWSTER.

Witnesses:
M. LAWSON DYER,
S. S. DUNHAM.